United States Patent Office 3,606,017
Patented Sept. 20, 1971

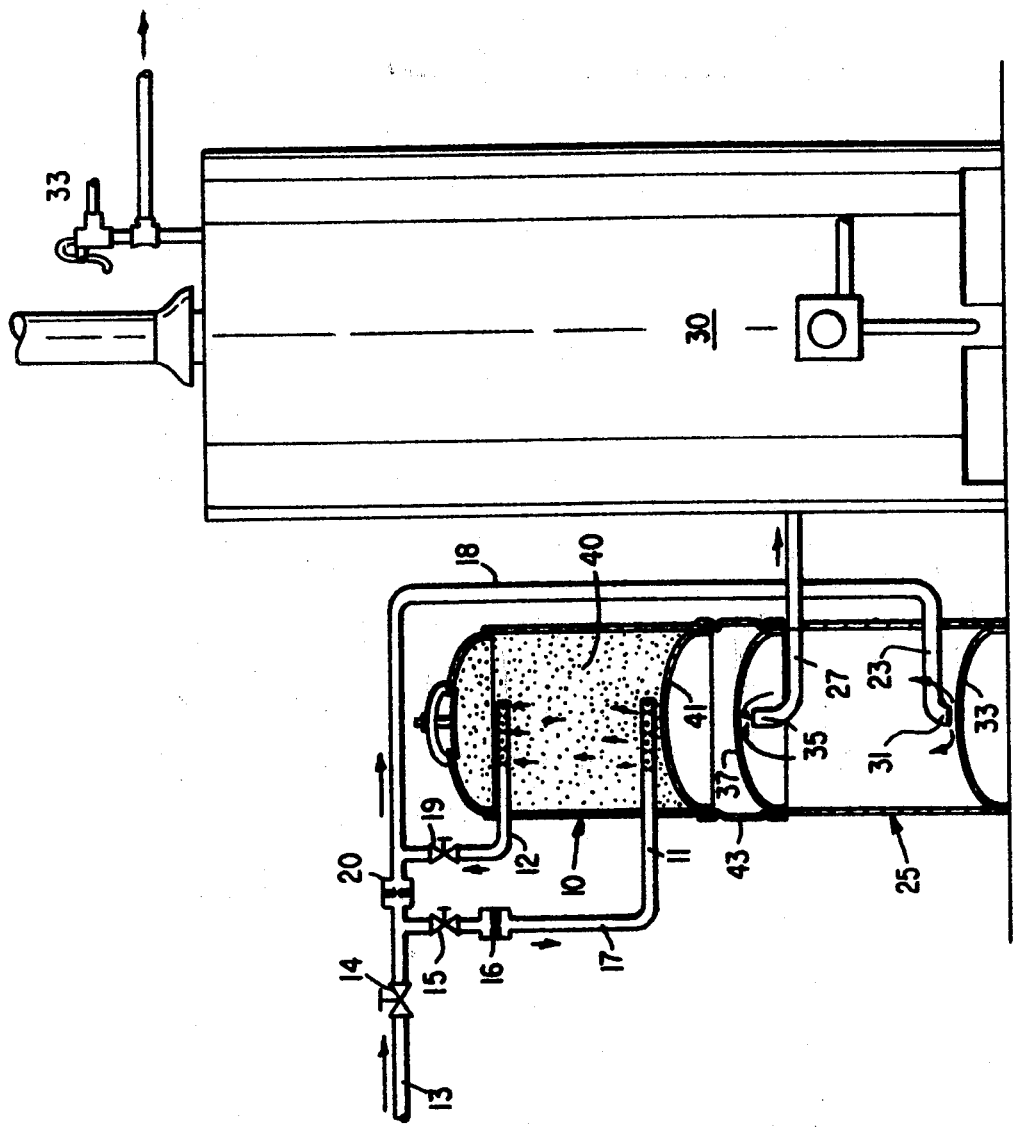

3,606,017
APPARATUS FOR CONDITIONING WATER
SUPPLIED TO A WATER HEATER TANK
Samuel J. Moore, Fayetteville, N.Y., assignor to
Carrier Corporation, Syracuse, N.Y.
Filed Aug. 1, 1969, Ser. No. 846,770
Int. Cl. C23f 14/00
U.S. Cl. 210—181                                    5 Claims

ABSTRACT OF THE DISCLOSURE

The water supply main is connected to the inlet of a first closed tank containing water-conditioning material. The outlet of the first tank is connected to the inlet of a second closed tank, the outlet of which is connected to the inlet of the heater tank. The second tank is dimensioned to contain a volume of water exceeding the expansion in volume of the initially cold water in the heater tank when it is raised to a predetermined temperature. The inlet and outlet of the second tank are located or arranged as not to disrupt the stratification of the water in the second tank upon the backflow from the heater tank whereby high temperature backflow from the heater tank does not enter the first tank containing the conditioning material.

BACKGROUND OF THE INVENTION

If a water heater is supplied with water of high hardness, the precipitation of lime is a very serious problem, the more so where the water is heated to high temperatures as from 180° F. to 190° F. It is known if such water is treated with polyphosphates as by passing the water supplied to the tank through a bed of such material, the precipitation of lime is eliminated, and accordingly, elimination of build-up of scale in the heater tank.

If the flow of hot water from the heater tank is intermittent, the expansion of the water in the heater due to temperature rise effects a back-up flow of hot water from the heater. Normally, the backflow is simply permitted to back toward or into the supply main. However, if the water is being treated with polyphosphate and the same is contacted by hot water, it quickly fuses or jells into a solid mass and thereafter serves no useful purpose.

The use of a check valve in the feed line to the heater to prevent backflow of the hot water is not satisfactory for various reasons, including the operation of the heater relief valve resulting in the waste of hot water. To avoid such undesired operation of the relief valve, an expansion tank may be inserted in the feed line intermediate the heater and the check valve. In such expansion tanks, the backflow acts directly or through a diaphragm against a confined volume of air which is compressible to accommodate the expansion of the water without operating the relief valve. However, these expansion tanks are high in first cost and require maintenance.

SUMMARY OF THE INVENTION

The invention has as an object apparatus for conditioning and feeding water to a water heater tank, the conditioning involving the use of polyphosphate material. The apparatus embodies a structural arrangement, particularly economical to build and which is substantially free from maintenance. More specifically, a closed tank containing the conditioning material has an inlet connected to the supply main and an outlet connected to the inlet of a second closed tank, the outlet of which is connected to the heater. The inlet and outlet of the second tank are located or arranged or baffled in such manner that hot water backflow from the heater cannot move directly from the outlet of the second tank to the inlet thereof. That is, the arrangement is such that the hot water backflow entering the second tank through the outlet thereof acts to displace the water which is at ambient temperature, forcing it through the inlet of the tank to the outlet of the conditioning tank. The second tank is dimensioned to contain a greater volume of water for displacement than the volume change of the water due to the thermal expansion.

BRIEF DESCRIPTION OF THE DRAWING

The drawing is a schematic illustration of the apparatus embodying my invention with the conditioning tank and displacement tank shown in vertical cross section.

DESCRIPTION OF THE PREFERRED EMBODIMENT

The conditioning tank is indicated at 10 and is provided with an inlet 11 and an outlet 12. The inlet 11 is connected to the water supply main 13 through a main valve 14, valve 15, control orifice 16, and pipe 17. The outlet 12 is connected to a line 18 through a valve 19. The line 18 is also connected to the main 13 through a control orifice 20.

The line 18 extends to the inlet 23 of a second tank 25. The outlet 27 of tank 25 is connected to the heater 30. The inlet 23 of tank 25 is in the form of a conduit extending through the side wall of the tank in the lower portion thereof and is provided with an elbow 31 facing downwardly in confronting relation to the bottom wall 33 of the tank.

The outlet 27 of tank 25 is also in the form of a conduit extending through the side wall of the tank and terminating in an upwardly facing elbow 35 confronting the top wall 37 of the tank in proximity thereto.

The tank 10 contains a quantity of conditioning material 40. In this case, this material is a polyphosphate, as for example the material designated 6R Micromet produced by the Calgon Company, Pittsburgh, Pa. The flow of water is upward through the bed of the polyphosphate material, the movement being from the inlet 11, which is positioned contiguous to the bottom wall 41 of tank 10, upwardly to the outlet 12. The treated water then enters the bottom of the tank 25 through inlet 23 and moves upwardly to the outlet elbow 35 and thence to the heater 30.

In the event that backflow takes place from the heater 30, this flow is discharged from the outlet elbow 35, effecting a downward displacement of the water in the tank 25 through the inlet elbow 31 and through line 18 to the outlet 12 of conditioning tank 10. It will be apparent because of the arrangement of the inlet 23 and outlet 27 of tank 25 the flow or movement of water from the outlet 35 is not direct to the inlet 23, but rather, the water in the tank 25 is displaced downwardly and it is at ambient temperature.

The size of the tank 25 is such to contain twice or more the volume of water than the volume change that is effected by the expansion of water in the heater 30. Accordingly, the high temperature backflow from the heater does not contact the mineral bed 40 in tank 10.

In the construction shown in the drawing, the tanks 10, 25 are arranged in vertical stack formation and are thermally insulated from each other in that the bottom 41 of tank 10 is spaced upwardly a distance from the top 37 of tank 25. This arrangement results in an economical structure, and the heat from the backflow through outlet 27 of the tank 25 is not transferred to the tank 10.

The tanks may be conveniently arranged in stack formation by the use of a coupling band 43.

I claim:
1. Apparatus for conditioning water supplied from a water supply main to a water heater tank having an inlet and in which the volume of water increases by the application of heat thereto, comprising a first closed tank having an inlet and an outlet, said tank being adapted to contain a bed of water conditioning material intermediate said inlet and outlet, a conduit connecting said inlet to the supply main, a second closed tank having an inlet and outlet arranged to prevent direct reverse movement of water from the outlet to the inlet of said second tank, a conduit connecting the outlet of said first tank to the inlet of said second tank, a conduit connecting the outlet of said second tank to the inlet of the heater tank, said second tank having a volume greater than the expansion volume change of the water in said heater tank at a predetermined temperature rise.

2. Apparatus as set forth in claim 1 wherein said first and second tanks are arranged in vertical stack formation, the inlets of said tanks being located in the lower portions of said tanks and the outlets of which are located in the upper portions of said tanks.

3. Apparatus as set forth in claim 1 wherein said first and second tanks are thermally insulated from each other.

4. Apparatus as set forth in claim 1 wherein the outlet of said second tank is arranged in confronting relation to the top wall of said tank.

5. Apparatus as set forth in claim 1 wherein the inlet of said second tank is arranged in confronting relation to the bottom wall of the tank, and said outlet is arranged in confronting relation to the top wall of said tank.

References Cited

UNITED STATES PATENTS

| 2,185,177 | 1/1940 | Bates | 210—198X |
| 2,891,622 | 6/1959 | Patterson et al. | 210—59X |

FOREIGN PATENTS

| 1,014,264 | 5/1962 | France | 210—265 |

MICHAEL ROGERS, Primary Examiner

U.S. Cl. X.R.

126—362; 210—198, 261